(12) United States Patent
Benner

(10) Patent No.: US 9,409,546 B2
(45) Date of Patent: Aug. 9, 2016

(54) SEATBELT-RETRACTING DEVICE

(75) Inventor: Markus Benner, Hardt (DE)

(73) Assignee: HUGO KERN UND LIEBERS GMBH & CO. KG, Schramberg (DE)

( * ) Notice: Subject to any disclaimer, the term of this patent is extended or adjusted under 35 U.S.C. 154(b) by 691 days.

(21) Appl. No.: 13/594,534

(22) Filed: Aug. 24, 2012

(65) Prior Publication Data

US 2013/0099043 A1   Apr. 25, 2013

(30) Foreign Application Priority Data

Oct. 21, 2011   (DE) .......................... 10 2011 085 024

(51) Int. Cl.
*B60R 22/44*   (2006.01)

(52) U.S. Cl.
CPC .......... *B60R 22/44* (2013.01); *B60R 2022/4433* (2013.01)

(58) Field of Classification Search
CPC ............... B60R 2022/4433; B60R 2022/4426
USPC ....................... 242/382.1, 383.4, 385.2, 385.3
See application file for complete search history.

(56) References Cited

U.S. PATENT DOCUMENTS

| | | | | |
|---|---|---|---|---|
| 3,558,075 A | * | 1/1971 | Stoffel | 242/382.1 |
| 3,632,058 A | * | 1/1972 | Stoffel | 242/383.1 |
| 3,664,599 A | * | 5/1972 | Partridge | 242/382.1 |
| 3,819,126 A | * | 6/1974 | Stoffel | 242/383.1 |
| 4,123,013 A | * | 10/1978 | Bottrill et al. | 242/372 |
| 4,124,175 A | * | 11/1978 | Cislak | 242/385.3 |
| 4,345,723 A | * | 8/1982 | Morinaga | 242/372 |
| 4,364,528 A | * | 12/1982 | Yanagihara | 242/385.3 |
| 4,391,421 A | * | 7/1983 | Naitoh et al. | 242/385.2 |
| 4,830,310 A | * | 5/1989 | Higbee | 242/383.4 |
| 4,856,728 A | * | 8/1989 | Schmidt et al. | 242/384.1 |
| 4,896,844 A | * | 1/1990 | Gavagan et al. | 280/807 |
| 5,065,954 A | * | 11/1991 | Cotter | 242/385.2 |
| 5,072,968 A | * | 12/1991 | Hamaue | 280/806 |
| 5,121,887 A | * | 6/1992 | Schmidt et al. | 242/385.2 |
| 5,289,987 A | * | 3/1994 | Collins et al. | 242/385.3 |
| 5,520,350 A | * | 5/1996 | Doty et al. | 242/385.3 |
| 6,454,198 B1 | * | 9/2002 | Girones et al. | 242/372 |
| 7,823,824 B2 | * | 11/2010 | Benner | 242/372 |
| 2006/0278748 A1 | * | 12/2006 | Shinya et al. | 242/382 |

FOREIGN PATENT DOCUMENTS

| | | |
|---|---|---|
| DE | 19952371 C1 | 4/2001 |
| DE | 102005017369 B3 | 8/2006 |

(Continued)

*Primary Examiner* — Emmanuel M Marcelo
*Assistant Examiner* — Justin Stefanon
(74) *Attorney, Agent, or Firm* — Jonathan A. Kidney; TechLaw LLP

(57) ABSTRACT

A device for retracting a seatbelt, having a shaft and main drive spring which prestresses the shaft in a retracting direction of the seatbelt, and a locking wheel rotatably arranged relative to the shaft, and a blocking device with a locking lever for blocking a rotational movement of the locking wheel in the retracting direction, and a compensating spring arranged such that when the locking wheel is blocked, said compensating spring transmits to the shaft a prestressing force counteracting the prestressing force of the main drive spring. The blocking device has a switching lever for activating the locking lever, the switching lever being arranged pivotably about an axis which is parallel to the axis of the shaft, and has a first engagement element and a second engagement element which is guided on a positive cam of a control disk which is connected in a rotationally fixed fashion to the shaft.

6 Claims, 3 Drawing Sheets

(56) References Cited

FOREIGN PATENT DOCUMENTS

Figure 1:
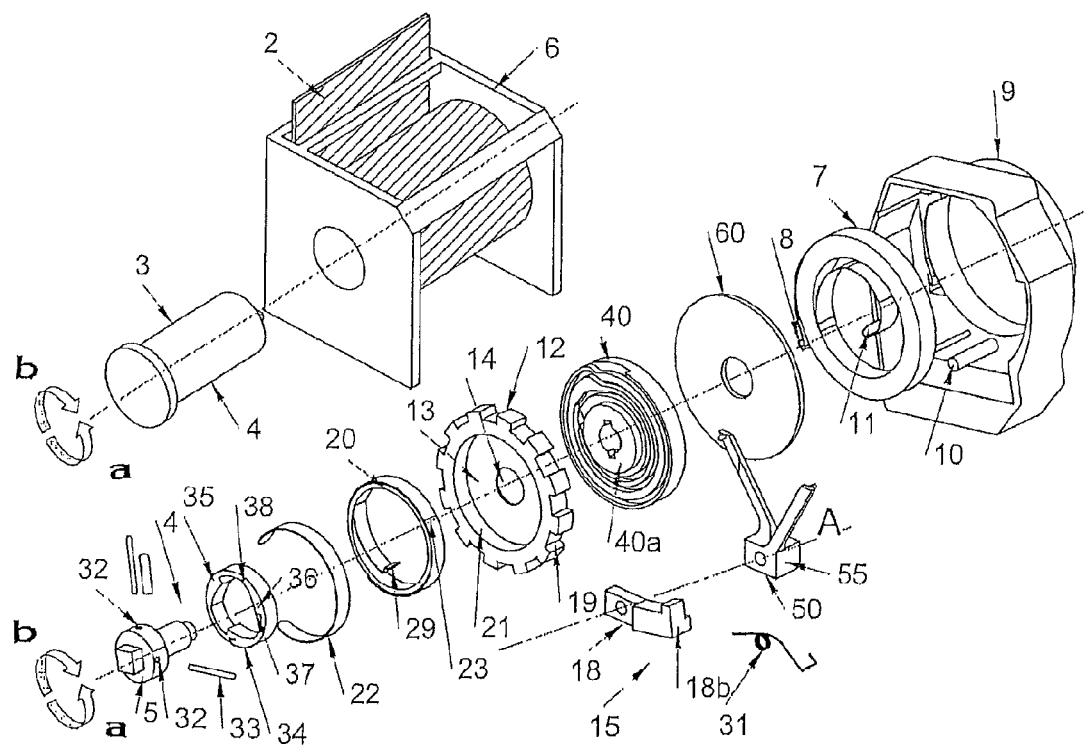

| DE | 102005017367 | A1 | 10/2006 |
| DE | 102006052167 | B3 | 2/2008 |
| JP | 2010-1377331 | A | 6/2010 |

\* cited by examiner

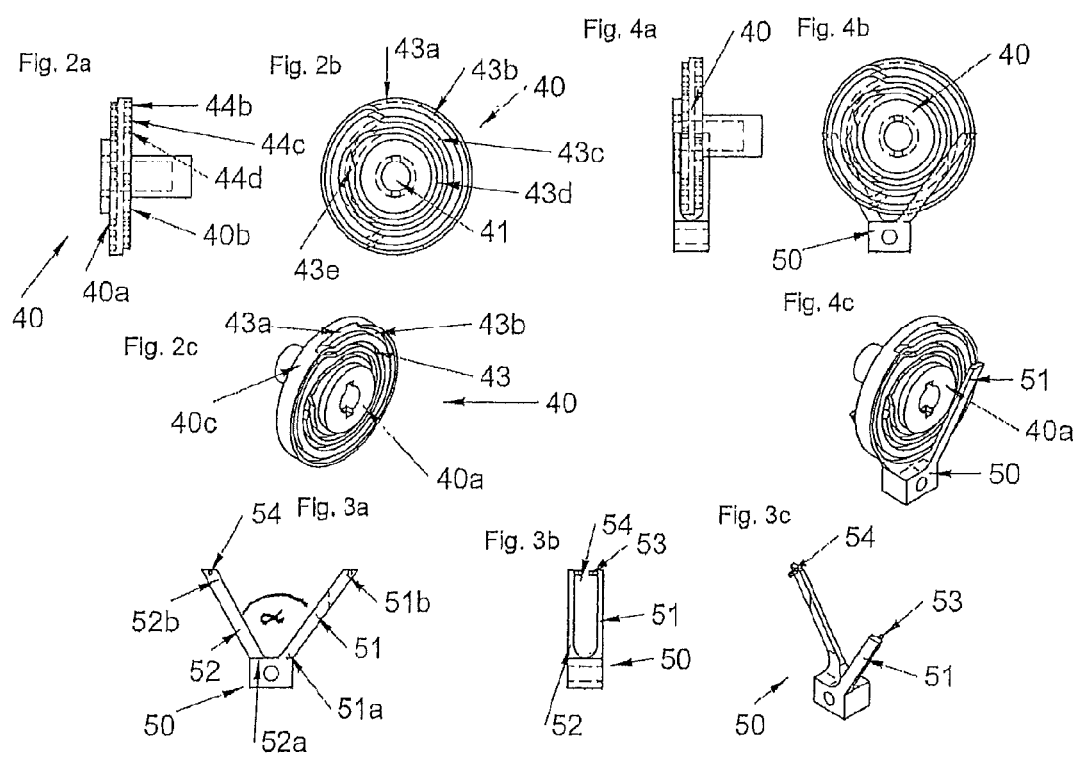

SEATBELT-RETRACTING DEVICE

CROSS-REFERENCE TO RELATED APPLICATION(S)

This application claims the benefit of German Patent Application No. 10 2011 085 024.4, filed Oct. 21, 2011, the contents of which are hereby incorporated by reference in its entirety.

The invention relates to a seatbelt-retracting device according to the preamble of patent claim 1 or 2.

Such a seatbelt-retracting device is known, for example, from DE 10 2006 052 167 B3, DE 10 2005 017 367 A1 or DE 10 2005 017 369 B3.

Known seatbelt-retracting devices have a shaft and a main drive spring which prestresses the shaft in a retracting direction of the seatbelt, wherein in addition a locking wheel which is rotatably arranged relative to the shaft and a blocking device with a locking lever for blocking a rotational movement of the locking wheel in the retracting direction are provided, and which seatbelt-retracting devices have a compensating spring which is arranged in such a way that when the locking wheel is blocked, said compensating spring can transmit to the shaft a prestressing force which counteracts the prestressing force of the main drive spring.

When the seatbelt is put on it is desirable that the retracting torque which is applied to the shaft by the main drive spring is reduced. This reduced torque comes about by virtue of the fact that the locking wheel is blocked in the retracting direction by means of the blocking device, as a result of which the main drive spring winds in the compensating spring in the event of a rearward movement of the driver or of the front seat passenger. In the process, the torque of the main drive spring is reduced by the torque required to wind in the compensating spring. As a result, a comfort effect is brought about for the person using the seatbelt. The seatbelt which is being worn rests against the user's body only by a slight pressure, while, in order to retract the seatbelt, the full torque of the main drive spring is available for reliable retraction of the belt.

In known seatbelt-retracting devices, the blocking device has here a magnetic actuator which is activated when the seatbelt lock is engaged and is deactivated again when the seatbelt lock is disengaged. The provision of the magnetic armature is, however, costly and also requires monitoring to determine whether the seatbelt lock is engaged or not.

U.S. Pat. No. 5,121,887 A discloses a seatbelt-retracting device having a mechanical actuator of the blocking device, which actuator, however, has to be activated manually by the person using the belt.

The invention is based on the object of proposing a seatbelt-retracting device which can be manufactured reliably and cost-effectively and which, in particular, does not require a magnetic actuator and which has, in particular, a favorable response behavior.

The object is achieved by means of a seatbelt-retracting device having the features of claim 1 or 2.

Advantageous refinements of the invention are specified in the dependent claims.

A first alternative of a device according to the invention for retracting a seatbelt, having a shaft and having a main drive spring which prestresses the shaft in a retracting direction of the seatbelt, and having a locking wheel which is rotatably arranged relative to the shaft, and having a blocking device with a locking lever for blocking a rotational movement of the locking wheel in the retracting direction, and having a compensating spring which is arranged in such a way that when the locking wheel is blocked, said compensating spring can transmit to the shaft a prestressing force which counteracts the prestressing force of the main drive spring, is characterized in that the blocking device has a switching lever for activating the locking lever, wherein the switching lever is arranged pivotably about an axis which is arranged parallel to the axis of the shaft, and has a first engagement element and a second engagement element which can be guided on at least one positive cam of a control disk which is connected in a rotationally fixed fashion to the shaft, wherein in each position of the shaft at least one of the engagement elements is in engagement with the control disk.

A second alternative of a device according to the invention for retracting a seatbelt, having a shaft and having a main drive spring which prestresses the shaft in a retracting direction of the seatbelt, and having a locking wheel which is rotatably arranged relative to the shaft, and having a blocking device with a locking lever for blocking a rotational movement of the locking wheel in the retracting direction, preferably also in the unrolling direction, and having a compensating spring which is arranged in such a way that when the locking wheel is blocked said compensating spring can transmit to the shaft a prestressing force which counteracts the prestressing force of the main drive spring, is characterized in that the blocking device has a switching lever for activating the locking lever, wherein the switching lever is arranged pivotably about an axis which is arranged parallel to the axis of the shaft, and has precisely one engagement element which can be guided on a positive cam of a control disk which is connected in a rotationally fixed fashion to the shaft.

Since one of the engagement elements of the switching lever or the one engagement element of the switching lever which is always in engagement with the control disk, it is possible to act directly on the switching lever when the shaft rotates, which permits a rapid response behavior. In addition, the locking lever can be activated by the switching lever when the shaft rotates, without the need for a magnetic actuator in order to activate the locking lever.

According to a particularly preferred embodiment of the invention there is provision that the entry into the positive cam is arranged in the outer wall of the control disk. This permits the situation in which the switching lever has to carry out exclusively a pivoting movement about an axis which is parallel to the axis of the shaft in order to engage the engagement elements with the control disk or disengage said engagement elements from the control disk.

According to an advantageous embodiment of the invention, the control disk has a first positive cam on which the first engagement element can be guided, and a second positive cam on which the second engagement element can be guided.

One particularly advantageous embodiment of the invention provides that the first and the second positive cams of the control disk are arranged on opposite sides of the control disk. This permits a compact arrangement.

The first and the second positive cams of the control disk are preferably of identical design in plan view, which permits cost-effective manufacture.

The first and the second positive cams are advantageously arranged rotated through 180° with respect to one another on the corresponding side face.

According to one particularly preferred embodiment of the invention, the first and/or the second positive cams are/is of spiral-shaped design with at least one turn, preferably two or more turns, wherein the inner turn leads back to the turn which is adjacent to the inner turn. As a result, in particular the safety belt can be pulled out as much as desired without an adverse effect on the position of the locking lever.

The switching lever preferably has two arms which are arranged at an angle with respect to one another, wherein the first engagement element is arranged at a first end of the first arm, and the second engagement element is arranged at a free end of the second arm. As a result, it is, in particular, made possible for either just one engagement element or for both engagement elements to be placed in engagement with the control disk.

There is advantageously provision that the two arms are arranged offset with respect to one another in the longitudinal direction of the shaft, in particular in such a way that the engagement elements of the arms can be guided along the first and second positive cams on the opposite sides of the control disk, which in particular allows for a compact design.

According to one preferred embodiment, the positive cam is embodied in a spiral shape with at least one turn, preferably two or more turns, wherein the inner turn leads back to the turn which is adjacent to the inner turn, and the outer turn leads back to the turn which is adjacent to the outer turn. This permits, in particular, the seatbelt to be pulled out as much as desired without an adverse effect on the position of the locking lever.

The outer winding is preferably of enclosed design, which means there is no inlet opening arranged in the outer wall of the control disk. This ensures that the engagement element does not disengage from the control disk.

The switching lever advantageously has precisely one arm, wherein the one engagement element is arranged at a free end of the arm.

The locking lever and the switching lever are preferably arranged so as to be pivotable relative to one another about the same axis which is arranged parallel to the axis of the shaft.

According to one embodiment of the invention, the switching lever has a stop face for a projection of the locking lever, in such a way that the locking lever is driven by the switching lever over a defined angular range of the pivoting movement of the switching lever, in order in this way, to bring about simple activation of the locking lever through the movement of the switching lever.

A free-wheeling clutch is to be advantageously provided between the shaft and the compensating spring, wherein the free-wheeling clutch permits, on the one hand, transmission of force from the shaft to the compensating spring when the shaft rotates in the retracting direction and, on the other hand, a relative movement of the coupling section of the compensating spring with respect to the shaft in the retracting direction. The free-wheeling clutch permits the main drive spring to prestress the compensating spring through rotation of the shaft when the locking wheel is blocked. In this case, the torque acting on the shaft from the main drive spring is reduced by the torque which is required to wind in the compensating spring. If the blocking of the locking wheel is released, the locking wheel rotates in the retracting direction as a result of the prestressed compensating spring acting on it. Since the free-wheeling clutch permits a relative movement of the coupling section of the compensating spring with respect to the shaft, abrupt breaking of the locking wheel does not occur when the compensating spring is completely wound up. The locking wheel can rotate relative to the shaft with the compensating spring in the retracting direction until the kinetic energy is consumed by friction.

It is advantageous if the compensating spring is a drive spring. The provision according to the invention of a free-wheeling clutch allows compensating springs to be used which are virtually of the same strength as the main drive spring which is used.

According to one expedient configuration of the invention there is provision that the coupling section is formed in order to bring about positive locking engagement of the inner end of the compensating spring with the driver device. In a structurally simple configuration, the coupling section of the compensating spring is of hook-shaped design. By means of the hook it is possible to engage the compensating spring in the receptacles of the driver device, wherein the hook-shaped coupling section can move relative to the shaft in the retracting direction by means of the receptacles of the driver device. However, it is also conceivable for the coupling section of the compensating spring to be formed by one separate component which is connected to the compensating spring.

In order to simplify the assembly, there is advantageously provision that the shaft is embodied in multiple parts, in particular in such a way that said parts can be plugged together. The driver device can be embodied here in one piece with the shaft or with a shaft component.

According to one advantageous configuration of the invention, there is provision for the compensating spring to be coupled to the locking wheel only in a frictionally locking fashion in the manner of a friction clutch. If, in the case of an engaged seatbelt lock, the working revolutions which are required to retract the seatbelt exceed the possible overall rotations of the compensating spring, the compensating spring can continue to rotate by virtue of the friction clutch after said compensating spring has been wound to a stop by the main drive spring. This prevents any hindrance of the rotation of the shaft in the retracting direction. The friction clutch according to the invention operates precisely and uniformly with the result that the same subjective impression is always given to the operator of the belt.

It is advantageous if the locking wheel has an inner circumference, and after the compensating spring has been completely wound up said compensating spring is arranged in such a way that it slips along the inner circumference of the locking wheel when the locking wheel is blocked and the shaft rotates in the retracting direction. The friction clutch is therefore formed by the compensating spring itself and the inner circumference of the locking wheel. The friction clutch permits further rotation of the compensating spring and therefore of the shaft in the retracting direction in the event of the maximum working range of the compensating spring being reached or exceeded.

In order to increase the contact pressure of the compensating spring on the locking wheel and therefore to increase both the static friction and the sliding friction between the compensating spring and the inner circumference of the locking wheel an expander spring is provided with which the compensating spring is pressed against the inner circumference of the locking wheel.

It is advantageous in structural terms and for the sake of rapid assembly if the expander spring is embodied as a spring element and this spring element is inserted into a turn of the compensating spring.

Figure 5A:
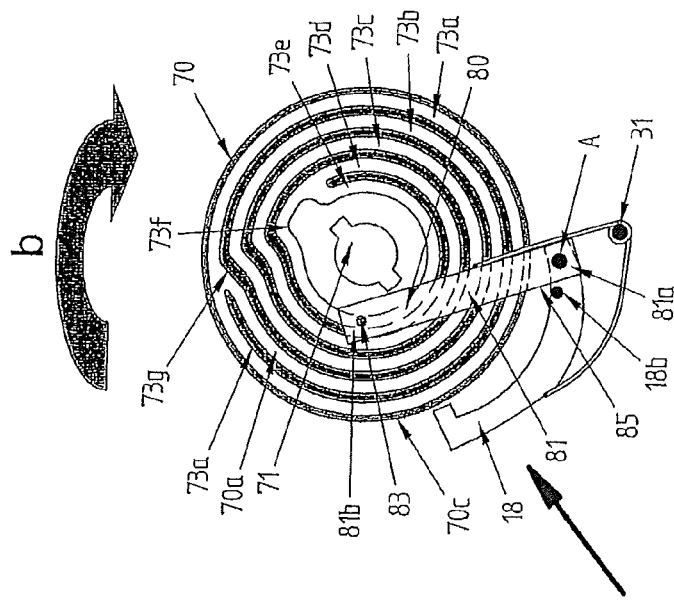
Figure 5B:
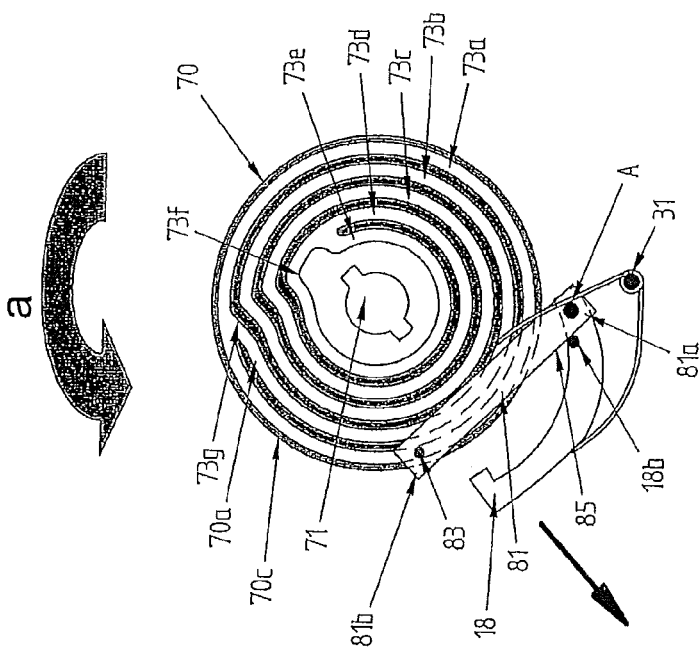

The invention will be described in more detail on the basis of the exemplary embodiment illustrated in the drawing, in which:

FIG. 1 shows an exploded illustration of the seatbelt-retracting device according to the invention, FIG. 2a shows a side view of the control disk of the seatbelt-retracting device according to FIG. 1, FIG. 2b shows a plan view of the control disk according to FIG. 2a, FIG. 2c shows a perspective view of the control disk according to FIG. 2a, FIG. 3a shows a plan view of the switching lever of the seatbelt-retracting device according to FIG. 1, FIG. 3b shows a side view of the switching lever according to FIG. 3a, FIG. 3c shows a perspective view of the switching lever according to FIG. 3a, FIG. 4a shows a side view of the control disk according to FIG. 2a with switching lever engaging thereon according to FIG. 3a, FIG. 4b shows a front view of the control disk with switching lever engaging thereon according to FIG. 4a, FIG. 4c shows a perspective view of the control disk with switching lever engaging thereon according to FIG. 4a, FIG. 5a shows a plan view of a control disk according to a second embodiment with the locking lever in the disengaged position, and the switching lever, and FIG. 5b shows a plan view of the control disk according to FIG. 5a with the locking lever in an engaged position.

FIG. 1 illustrates a seatbelt-retracting device 1. A seatbelt 2 can be wound onto a seatbelt-retracting section 3 of a shaft 4 by means of the seatbelt-retracting device 1. The shaft 4 is constructed in two parts and is composed of the seatbelt-retracting section 3 and a drive section 5. The shaft 4 is rotatably mounted in a belt housing 6.

Furthermore, the seatbelt-retracting device 1 comprises a main drive spring 7 which is fixedly connected by its outer end 8 to a plastic housing 9. The plastic housing 9 is laterally connected to the belt housing 6 by means of three tappets 10.

The main drive spring 7 is connected in a rotationally fixed fashion by its inner end 11 to the drive section 5 of the shaft 4. As a result, when the shaft 4 rotates in the unrolling direction b, that is to say when the belt 2 is unwound, the shaft 4 is prestressed in the retracting direction a by the main drive spring 7.

Furthermore, the seatbelt-retracting device 1 comprises a locking wheel 12 which is arranged adjacent to the main drive spring 7 and coaxially with respect to the drive section 5 of the shaft 4, and is rotatable in two directions of rotation relative to the drive section 5 of the shaft 4. For reasons of stability, a disk 13 is provided on the side of the locking wheel 12 facing the main drive spring 7, said disk 13 being constructed in one piece with the locking wheel 12. The disk 13 has a central through-opening 14 for the drive section 5 of the shaft 4. A blocking device 15 with a pivotably mounted locking lever 18 is assigned to the locking wheel 12. Furthermore, the blocking device 15 comprises a spring 31 for the locking lever 18. The locking lever 18 interacts with teeth or grooves 19 provided over the outer circumference of the locking wheel. The blocking device serves to block a rotational movement of the locking wheel 12 in the retracting direction a. When teeth are arranged on the locking wheel 12, a rotation of the locking wheel 12 in the unrolling direction b is possible at any time. When the locking lever 18 is applied, the free-wheel which is described below assumes the rotational movement of the locking wheel 12 which is then blocked.

A compensating spring 20, which is also embodied as a drive spring, is arranged inside the locking wheel 12. The compensating spring 20 is not connected in a positively locking fashion to the locking wheel 12 but rather bears with its outer winding on the inner circumference 21 of the locking wheel 12. In order to increase the contact pressure of the compensating spring 20 on the inner circumference 21 of the locking wheel 12, an expander spring 22, which is embodied as a circumferential spring piece, is provided, which expander spring 22 is arranged inside the outer winding of the compensating spring and therefore presses the outer winding of the compensating spring 20 against the inner circumference 21 of the locking wheel 12. The outer end 23 of the compensating spring 20 is bent inward in a hook shape. As a result, the expander spring 22 is held in its circumferential position with respect to the compensating spring 20. The transmission of force between the compensating spring 20 and the locking wheel 12 occurs both in the retracting direction a and in the unrolling direction b in a frictionally locking fashion by means of the friction clutch which is formed by the compensating spring 20 and the inner circumference 21 of the locking wheel 12.

A free-wheeling clutch is arranged inside the compensating spring 20, which free-wheeling clutch is effective between the compensating spring 20 and the drive shaft 5 of the shaft 4. When the locking wheel 12 is blocked, the free-wheeling clutch permits force to be transmitted from the shaft 4 to the compensating spring 20 in the retracting direction a and, on the other hand, permits a relative rotating movement of the inner end 29 of the compensating spring 20 with respect to the shaft 4 in the retracting direction a when the locking wheel 12 is not blocked. In the case of a relative rotation of the shaft 4 with respect to the compensating spring 20 in the retracting direction a, the free-wheeling clutch brings about positively locking engagement between the shaft 4 and the inner end 29 of the compensating spring 20. The shaft 4 drives the inner end 29 of the compensating spring 20 and stresses the compensating spring 20, with the result that it applies a rotational prestressing force to the drive section 5 of the shaft 4 in the unrolling direction b. Conversely, the free-wheeling clutch permits a relative rotation of the inner end 29 of the compensating spring 20 with respect to the drive section 5 of the shaft 4 in the retracting direction a.

In the text which follows, the method of functioning of the seatbelt-retracting device 1 is described.

The main drive spring 7 is continuously in engagement with the drive section 5 of the shaft 4 and with the plastic housing 9, with the result that when the seatbelt 2 is taken off, the main drive spring 7 continuously applies a prestressing force to the drive section 5 of the shaft 4 in the retracting direction a. When the seatbelt 2 is put on, the locking wheel 12 can rotate freely in the retracting direction a until the locking lever 18 (described in more detail below) engages. In this blocking position, the locking lever 18 interacts in a positively locking fashion with the steep edges of the teeth of the locking wheel 12 and in doing so prevents the locking wheel 12 from rotating in the retracting direction a. The locking wheel 12 can then only rotate in the unrolling direction b. Alternatively, the toothing can also be configured in such a way that a rotation in the unrolling direction b is also prevented by virtue of the fact that a toothing is provided with radially extending grooves 19.

When the seatbelt is retracted, that is to say when the shaft 4 rotates in the retracting direction a as a result of the application of force by means of the main drive spring 7, the free-wheeling clutch is moved into engagement with the result that the shaft 4 drives the inner end 29 of the compensating spring 20, as a result of which the compensating spring 20 is wound up when the locking wheel 12 is blocked. The torque which is required to wind up the compensating spring 20 acts counter to the torque of the main drive spring 7 here, with the result that the torque of the main drive spring 7 is reduced by the torque which is required to wind up the compensating spring 20. This reduced torque acts on the shaft 4 and therefore on the belt 2 in the retracting direction a and generates the desired comfort effect for the driver.

If, when the locking wheel 12 is blocked, the working range of the compensating spring 20 is exceeded, that is to say the revolutions of the shaft 4 which are required to retract the seatbelt 12 exceed the maximum possible total revolutions of the compensating spring 20, the compensating spring can slide along the inner circumference 21 of the blocked locking wheel 12 in the retracting direction a. The shaft 4 can therefore continue to rotate in the retracting direction a until the seatbelt 2 bears against the driver's or front seat passenger's body. The static friction and the sliding friction between the outer circumference of the compensating spring 20 and the inner circumference 21 of the locking wheel 12 can be varied depending on the dimensioning of the expander spring 22. A defined slipping torque is generated by the provision of the expander spring 22.

When the seatbelt 2 is released, the locking lever 18 is, as described in more detail below, pivoted out of its blocking position in the radial direction counter to the spring force of the spring 31. Driven by the torque of the compensating spring 20, the locking wheel 12 begins to rotate directly in the retracting direction a, wherein the stress of the compensating spring 20 is released. The rotation of the locking wheel 12 occurs at a high speed in the retracting direction a. The retraction of the seatbelt 2 occurs by means of the entire torque of the main drive spring 7 when the locking wheel 12 is not blocked.

The configuration of the free-wheeling clutch is variable and can be embodied, for example, as follows. Two guide grooves or guide passage openings 32 are formed in the end face of the drive section 5 of the shaft 4, which guide grooves extend diametrically over the entire diameter of the drive section 5. In each case a locking element which is embodied as a linear locking pin 33 is arranged in the guide grooves 32. The locking pins 33 are of a length which is somewhat greater than the diameter of the drive section 5. The locking pins 33 are guided in a freely sliding fashion in the guide grooves 32.

The drive section 5 is enclosed coaxially by a locking ring 34. In the outer circumference of the locking ring 34, the inner end 29 of the compensating spring 20 is suspended in a rotationally fixed fashion. The locking ring 34 has an inner toothing with which the ends of the locking pins 33 interact. The inner toothing of the locking ring 34 has an uneven number of teeth 35 which are arranged with the same angular pitch. In the illustrated exemplary embodiment, three teeth 35, which are respectively offset by 120° with respect to one another, are provided. The teeth 35 each have a tooth back 36 which rises gently in a direction of rotation and a tooth face 37 which falls steeply in the radial direction. A tooth depression 38 with a substantially constant diameter is formed between the tooth face 37 of a tooth 35 and the start of the rising tooth back 36 of the following tooth 35. As a result of the uneven number of the teeth 35, a tooth depression 38 is in each case arranged diametrically opposite the rising tooth back 36 of a tooth 35.

The free-wheeling clutch of FIGS. 1 and 2 operates in the following way.

If the shaft 4 rotates in the retracting direction a, one of the locking pins 33 abuts with its end projecting over the circumference of the drive section 5 against the tooth face 37 of the next tooth 35 in a positively locking fashion, as a result of which the drive section 5 drives the locking ring 34, and therefore the inner end 29 of the compensating spring 20, in a positively locking fashion. Since the tooth face 37 of the tooth 35 extends substantially radially with respect to the axis of the drive section 5, the locking pin is held bearing against this tooth face 37 and is not pressed by it into the drive section 5. Since two locking pins 33 are provided, there is a halving of the rotational angle of the drive section 5 after which at the latest one of the locking pins 33 abuts against a tooth 35 and the free-wheeling clutch therefore comes into engagement in order to drive the locking pin 34 and the compensating spring 20.

If, on the pulling out of the seatbelt 2, the shaft 4 rotates with the drive section 5 in the unrolling direction b with respect to the locking ring 34 or if the locking ring 34 rotates in the retracting direction a with respect to the drive section 5 when the belt lock is triggered and when the locking wheel is released, the ends of the locking pins 33 which respectively project radially out over the circumference of the drive section 5 run along the rising tooth back 36 of a tooth 35. In this context, this tooth back 36 presses the protruding first end of the respective locking pin 33 radially inward in its guide groove 32, as a result of which the opposite second end of this locking pin 33 is pushed out from the circumference of the drive section 5 on the diametrically opposite side. Since a tooth depression 38 is located in each case on this diametrically opposite side of the tooth back 36, the second end of the locking pin 32 can move out without hindrance over the circumference of the drive section 5. During the further rotation, this second end of the locking pin 33 now comes into contact with the rising tooth back 36 of the next tooth 35 and is pressed into the circumference of the drive section 5 again by this tooth back. This is possible since during this rotation the first end of the locking pin 33 has in the meantime been moved away over the tooth back 36 and has arrived in the region of a tooth depression 38. During this rotation of the shaft 4 in the unrolling direction b relative to the locking ring 34 or during the rotation of the locking ring in the retracting direction a with respect to the shaft 4, a free-wheeling effect is therefore produced since the locking pins 33 are pushed diametrically to and fro in the guide grooves 32 by the teeth 35 and do not impede the rotation.

The driving effect in one relative direction of rotation and the free-wheeling effect in the opposite relative direction of rotation are reliably ensured here without the locking pins 33 being under a spring effect.

The activation of the locking lever 18 by means of the blocking device 15 is explained in more detail, in particular, with respect to FIGS. 2 to 4 and with respect to FIG. 5.

The blocking device 15 has in a first embodiment (cf. in particular FIG. 4) a control disk 40 (cf., in particular, FIG. 2) and a switching lever 50 (cf., in particular, FIG. 3).

The control disk 40 has a first side 40a, a side 40b lying opposite the first side 40a, and a substantially cylindrical outer wall 40c. The control disk 40 is connected in a rotationally fixed fashion to the shaft 4. For this purpose, the control disk 40 has, in particular, an out-of-round recess 41 with which it can be attached to the shaft 4. The control disk 40 is arranged, in particular, between the locking wheel 12 and the main drive spring 7 on the shaft 4. In order to protect the main drive spring 7 it is possible to arrange a disk 60 between the control disk 40 and the main drive spring.

The control disk 40 has on its first side 40a a first positive cam 43. In this context, the positive cam 43 is embodied as a groove which is formed in the first side 40a. The groove ends in the outer wall 40c of the control disk and forms an inlet 43a there. The first positive cam 43 is embodied in a substantially spiral shape with a plurality of turns, here three, 43b, 43c, 43d. In this context, the innermost turn 43d is led back to the adjacent turn 43c via a connection 43e. The control disk 40 has on its second side 40b a second positive cam 44 which is embodied, in particular, in an identical shape to the first positive cam 43 and has an inlet 44. In this context, the two positive cams 43, 44 are arranged rotated through 180° with respect to one another on the sides 40a, 40b, with the result that the two entries 43a, 44a are arranged substantially diametrically opposite in the outer wall 40c of the control disk 40.

The switching lever 50 has a first arm 51 with a first end 51a and a second end 51b as well as a second arm 52 with a first end 52a and a second end 52b. The two arms 51, 52 are connected to one another at their first end 51a, 52a at an angle α, with the result that they form in plan view, in particular, a substantially V-shaped element (cf. FIG. 3a). The switching lever 50 is arranged rotatably about an axis A which runs essentially parallel to the axis of the shaft 4. Furthermore, the axis A runs essentially perpendicularly to the longitudinal extent of the arms 51, 52 and perpendicularly to the surface of the arms 51, 52. In this context, the arms 51, 52 are, however, arranged offset with respect to one another in the longitudinal direction of the shaft 4, with the result that said arms form, in particular, a substantially U-shaped element in side view (cf. FIG. 3b). The distance between the arms 51, 52 in the longitudinal direction of the shaft 4 is dimensioned here in such a way that in the mounted state the control disk 40 can be arranged between the arms 51, 52 (cf. FIG. 4a).

At the free second end 51b of the first arm 51, a first engagement element 53 is arranged, while at the free second end 52b of the second arm 52 a second engagement element 54 is arranged. The engagement elements 53, 54 are embodied, in particular, as pins which are arranged perpendicularly to the surface of the arm 51, 52 and perpendicularly to the longitudinal extent of the arm 51, 52. Furthermore, the engagement elements 53, 54 are arranged on the arms 51, 52 in such a way that they are directed toward one another and can therefore engage, in particular, in the positive cams 53, 54 arranged on the sides 40a, 40b of the control disk 40. The first engagement element 53 engages here in the first positive cam 43, while the second engagement element 54 engages in the second positive cam 44. The engagement elements 53, 54 which are embodied as pins can therefore be guided, in particular, in and along the positive cams 43, 44 embodied as grooves.

The activation of the locking lever 18 takes place as follows. When the seatbelt 2 is retracted completely, the first engagement element 53 is in engagement in the first positive cam 43, in particular in the inner turn 43d, while the second engagement element 54 is arranged radially outside the control disk 40. The spring 31 acts on the locking lever 18, which locking lever 18 bears under the prestress of the spring 31 with a projection 18b against a stop face 55 on the switching lever 50. In this context, the locking lever 18 does not engage in the teeth or grooves 19 of the locking wheel 12. The locking lever 18 and the switching lever 50 are both arranged pivotably about the same axis A here, wherein the two levers can basically be rotated relative to one another.

If the seatbelt 2 is pulled out, the first engagement element 53 is [lacuna] into the central turn 43c along the first positive cam 43 after one revolution of the shaft 4. In this context, the switching lever 50 pivots about the axis A. After a further revolution of the shaft 4, the first engagement element 53 is guided into the outer turn 43b, while the second engagement element 54 is guided radially through the inlet 44a into the second positive cam 44. During the pivoting movement of the switching lever 50, in particular as soon as the second engagement element 54 reaches the inlet 44a, the locking lever 18 is released in such a way that, under the action of the spring 31, it enters into engagement with the teeth or grooves 19 of the locking wheel 12 and blocks the rotation of the locking wheel. This therefore already takes place after a few revolutions, in particular one to two revolutions, of the shaft 4 and therefore already before the belt lock is engaged, which permits a very good response behavior. If the seatbelt 2 is pulled out further, the second engagement element 54 is guided along the second positive cam into the central turn 44c and finally into the inner turn 44d, in which case in the event of further pulling out of the seatbelt 2 it is guided further in the inner turn 44d and in the process carries out a rocking movement, since the inner turn 44d is not of circular design owing to the return via the connection 44e. However, the position of the locking lever 18 is not changed here.

If the belt lock is engaged and the shaft 4 is no longer rotated substantially, a slight retracting movement is necessary in order to activate the compensating spring 20. If the seatbelt 2 is pulled in further, the compensating spring 20, after its maximum possible revolutions have been reached, slips through in the locking wheel 12.

If the belt lock is released and the seatbelt 2 is retracted, the switching lever 50 is pivoted back radially outward in the second positive cam 44 by movement of the second engagement element 54. The first engagement element 53 enters the first positive cam 43 radially again at the inlet 43a, and subsequently during a further retracting movement the second engagement element 54 exits the second positive cam 44 radially at the inlet 44a and is finally pivoted to such an extent that the locking lever 18 is driven further counter to the force of the spring 31 and is disengaged from the teeth or grooves of the locking wheel 12. While the locking lever 18 is still in engagement with the locking wheel 12, the torque of the compensating spring 20 is still opposed to the torque of the main drive spring 7. As soon as the locking lever 18 is disengaged from the locking wheel 12, the locking wheel 12 can rotate again freely and the entire torque of the main drive spring 7 is available again for the retraction of the seatbelt 2. The blocking device 15 has, in a second embodiment (cf. in particular FIG. 5), a control disk 70 and a switching lever 80. The control disk 70 and the switching lever 80 can be used, instead of the control disk 40 and the switching lever 50, in the exemplary embodiment of the device 1, described in FIG. 1, for retracting a seatbelt 2.

The control disk 70 has a first side 70a, a side lying opposite the first side 70a, and a substantially cylindrical outer wall 70c. The control disk 70 is connected in a rotationally fixed fashion to the shaft 4. For this purpose, the control disk 70 has, in particular, an out-of-round recess 71 with which it can be attached to the shaft 4. The control disk 70 is arranged, in particular, between the locking wheel 12 and the main drive spring 7 on the shaft 4. In order to protect the main drive spring 7, a disk 60 can be arranged between the control disk 40 and the main drive spring. However, since, as described below, the control disk 70 only has a single positive cam 73, and therefore the side lying opposite the first side 70a can be embodied in a substantially smooth fashion, this disk 60 can preferably be dispensed with, with the result that the necessary installation space is reduced.

The control disk 70 has on its first side 70a a single positive cam 73. In this context, the positive cam 73 is embodied as a groove formed in the first side 70a. The first positive cam 73 is embodied in a substantially spiral shape with a plurality of turns, in the present case five, 73a, 73b, 73c, 73d, 73e. In this context, the innermost turn 73e is led back via a connection 73f to the turn 73d adjacent to the inner turn 73e. Furthermore, the outermost turn 73a is led back via a connection 73g to the turn 73b which is adjacent to the outer turn 73a. The connections 73f, 73g are configured here in such a way that the corresponding turns 73a, 73b and 73d, 73e gradually approach one another, with the result that the connections 73f, 73g are configured approximately in a V shape. In this context, the V-shaped connections 73f, 73g open in opposing directions of rotation. The outer turn 73a is, in particular, of closed design so that the outer wall 70c can be configured in an uninterrupted fashion.

The switching lever 80 has an arm 81 with a first end 81a and a second end 81b. The switching lever 80 is arranged rotatably about an axis A which runs essentially parallel to the axis of the shaft 4. Furthermore, the axis A runs essentially perpendicularly to the longitudinal extent of the arm 81 and perpendicularly to the surface of the arm 81. Since, unlike the switching lever 50 of the first exemplary embodiment according to FIG. 3, has only one arm, the necessary installation space can be shortened further, since there is no need to guide a further arm on the side of the control disk 70 lying opposite the first side 70a.

Precisely one engagement element 83 is arranged at the free second end 81b of the arm 81. The engagement element is embodied, in particular, as a pin which is arranged perpendicularly to the surface of the arm 81 and perpendicularly to the longitudinal extent of the arm 81. Furthermore, the engagement element 83 is arranged on the arm 81 in such a way that it can engage, in particular, in the positive cam 73 arranged on the side 70a of the control disk 70. The engagement element 83 which is embodied as a pin can therefore be guided, in particular, in and along the positive cam 73 which is embodied as a groove.

The locking lever 18 is activated as follows. When the seatbelt 2 is retracted completely, the engagement element 83 is in engagement in the positive cam 43, in particular in the outer turn 73a (cf. FIG. 5a). The spring 31 acts on the locking lever 18, which locking lever 18 bears under prestress of the spring 31 with a projection 18b against a stop face 55 on the switching lever 80. In this context, the locking lever 18 does not engage in the teeth or grooves 19 of the locking wheel 12. The locking lever 18 and the switching lever 50 are both arranged pivotably about the same axis A here, with both being basically rotatable relative to one another.

If the seatbelt 2 is pulled out in the unrolling direction b, the first engagement element 83 is guided along the positive cam 73 into the turn 73b after one revolution of the shaft 4 since, in the outer region, the switching lever 80 is pressed by the spring 31 in an inward direction with respect to the rotational axis of the control disk 70 by the contact between the stop face 85 and the stop 18b of the locking lever 18. In this context, the switching lever 80 pivots about the axis A. After a further revolution of the shaft 4, the engagement element 83 is guided into the turn 73c, subsequently into the turn 73d and finally into the inner winding 73e via the connection 73f. On the way to the inner turn 73e, the contact between the stop face 85 of the switching lever 80 and the stop 18b of the locking lever 18 is released. However, as a result of the positive cam 83, the switching lever 80 is carried along further inward during the rotation of the shaft 4. During further revolutions of the shaft 4, the engagement element 83 remains in the inner turn 73e. The connection 73f opens when the belt is pulled out in the direction of rotation, with the result that the V-shaped configuration prevents the engagement element 83 from being able to be moved into the turn 73d which is adjacent to the inner turn 73e. During the pivoting movement of the switching lever 80, the locking lever 18 is released in such a way that under the action of the spring 31 it enters into engagement with the teeth or grooves 19 of the locking wheel 12 and blocks the rotation of the locking wheel. This therefore already takes place after a few, in particular one to two, revolutions of the shaft 4 and therefore already before the belt lock engages, which permits a very good response behavior.

In this position, the contact between the stop face 85 of the switching lever 80 and the stop 18b of the locking lever 18 is released.

If the belt lock is engaged and the shaft 4 is no longer rotated substantially, a slight retracting movement is necessary to activate the compensating spring 20. If the seatbelt 2 is pulled in further, said seatbelt slips through in the locking wheel 12 after the maximum possible revolutions of the compensating spring 20 have been reached.

If the belt lock is released and the seatbelt 2 is retracted, the switching lever 80 is pivoted back radially outward as a result of being acted upon by the spring 31 and the movement of the engagement element 83 in the positive cam 73. Since during the rotation of the shaft 4 in the retracting direction the connection 73f opens counter to the direction of rotation, the engagement element 83 can be moved into the turn 73d which is adjacent to the inner turn 73e. During further rotation of the shaft 4 in the retracting direction, the engagement element 83 passes through the turns 73d, 73c, 73b as far as the outer turn 73a. In this context, the switching lever 80 is guided outward, wherein after a few revolutions, in particular one to two revolutions, the contact face 85 of the switching lever 80 enters into contact again with the stop 18b of the locking lever 18 and carries along said stop 18b outward counter to the force of the spring 31. In the process, the locking lever 18 is disengaged from the teeth or grooves of the locking wheel 12. While the locking lever 18 is still in engagement with the locking wheel 12, the torque of the compensating spring 20 is still opposed to the torque of the main drive spring 7. As soon as the locking lever 18 is disengaged from the locking wheel 12, the locking wheel 12 can rotate freely again and the entire torque of the main drive spring 7 is available again for the retraction of the seatbelt 2.

LIST OF REFERENCE SYMBOLS

1 Seatbelt-retracting device
2 Seatbelt
3 Retracting section
4 Shaft
5 Drive section
6 Belt housing
7 Main drive spring
8 Outer end
9 Plastic housing
10 Journal
11 Inner end
12 Locking wheel
13 Disk
14 Through-opening
15 Blocking device
18 Locking lever
18b Projection
19 Grooves
20 Compensating spring
21 Inner circumference
22 Expander spring
23 Outer end
29 Inner end
31 Spring
32 Guide grooves
33 Locking pin
34 Locking ring
35 Teeth 36 Tooth back
37 Tooth face
38 Tooth depression
40 Control disk
40a First side
40b Second side
40c Outer wall
41 Recess
43 First positive cam
43a Inlet
43b,c,d Turn
43e Connection
44 Second positive cam
44a Inlet
44b,c,d Turn
44e Connection
50 p Switching lever
51 First arm
51a First end
51b Second end
52 First arm
52a First end
52b Second end
53 First engagement element
54 Second engagement element
55 Stop face
60 Disk
70 Control disk
71 Recess
73 Positive cam
73a,b,c,d,e Turn
73f,g Connection
80 Switching lever
81 Arm
81a First end
81b Second end
83 Engagement element
85 Stop face
a Retracting direction
b Unrolling direction
A Axis
α Angle

The invention claimed is:

1. A device for retracting a seatbelt, comprising:
a shaft and having a main drive spring which prestresses the shaft in a retracting direction of the seatbelt, and having a locking wheel which is rotatably arranged relative to the shaft, and having a blocking device with a locking lever for blocking a rotational movement of the locking wheel in the retracting direction, and having a compensating spring which is arranged in such a way that when the locking wheel is blocked, said compensating spring can transmit to the shaft a prestressing force which counteracts the prestressing force of the main drive spring, wherein the blocking device has a switching lever for activating the locking lever, wherein the switching lever is arranged pivotably about an axis which is arranged parallel to the axis of the shaft, and has precisely one engagement element which can be guided on a positive cam of a control disk which is connected in a rotationally fixed fashion to the shaft, wherein the positive cam is embodied with at least one turn spiraling towards a center of the cam, wherein an outermost gap formed from an outermost turn leads to a gap formed from an outer adjacent turn and an innermost gap formed from an innermost turn leads to a gap formed from an inner adjacent turn.

2. The device according to claim 1, wherein the outer turn is closed.

3. The device according to claim 1, wherein the switching lever has precisely one arm, wherein the engagement element is arranged at a free end of the arm.

4. The device according to claim 1, wherein the locking lever and the switching lever are arranged so as to be pivotable relative to one another about the same axis which is arranged parallel to the axis of the shaft.

5. The device according to claim 1, wherein the switching lever has a stop face for a projection of the locking lever, in particular in such a way that the locking lever is driven by the switching lever over a defined angular range of the pivoting movement of the switching lever.

6. The device according to claim 1, wherein the locking lever and the switching lever are arranged so as to be pivotable relative to one another about the same axis which is arranged parallel to the axis of the shaft.

* * * * *